United States Patent [19]
Strauss

[11] Patent Number: 5,896,139
[45] Date of Patent: Apr. 20, 1999

[54] SYSTEM AND METHOD FOR OPTIMIZING A SCENE GRAPH FOR OPTIMIZING RENDERING PERFORMANCE

[75] Inventor: Paul S. Strauss, Sharon, Mass.

[73] Assignee: Platinum technology IP, inc., Oakbrook Terrace, Ill.

[21] Appl. No.: 08/694,759

[22] Filed: Aug. 1, 1996

[51] Int. Cl.$^6$ .................................................. G06F 15/00
[52] U.S. Cl. .................................................. 345/440
[58] Field of Search .......................... 345/420, 440, 345/441, 339, 357, 358

[56] References Cited

U.S. PATENT DOCUMENTS 5,680,530  10/1997  Selfridge et al. ................. 395/140

*Primary Examiner*—Phu K. Nguyen
*Attorney, Agent, or Firm*—Fish & Richardson P.C.

[57] ABSTRACT

A system, method and computer program product for optimizing a scene graph for optimizing rendering performance. The nodes of an original scene graph are rearranged to minimize a number of state changes while rendering the scene graph. The shapes of the original scene graph are further broken into a plurality of triangular strip sets, which lend to a better rendering performance. The system, method and computer program product also performs transformations on an object in the scene graph and sends the transformed object to a rendering library, which minimizes an amount of data transferred to the rendering library.

19 Claims, 8 Drawing Sheets

SYSTEM AND METHOD FOR OPTIMIZING A SCENE GRAPH FOR OPTIMIZING RENDERING PERFORMANCE

BACKGROUND OF THE INVENTION

1. Field of the Invention

The present invention relates generally to the field of computer graphics systems, and more particularly to a system and method for converting a scene graph for optimizing rendering performance.

2. Related Art

"Scene graphs" are well-known data structures for representing multi-dimensional objects, particularly in object-oriented languages such as C++. A scene graph typically contains several nodes, with each node representing one of grouping, property, or shape information. A shape node may specify a shape, and a property node may specify properties such as color or texture of the shape. The nodes are connected by lines which define a sequence of traversal of the nodes. For further details on scene graphs and object oriented programming, the reader is referred to, "The Inventor Mentor", by Josie Wernecke, published by Addison-Wesley (ISBN 0-201-62495-8), and to, "Object-Oriented Software Engineering", by Jacobson et al., published by Addison-Wesley (ISBN 0-201-54435-0), which are both incorporated herein by reference.

An object represented by a scene graph is displayed generally by rendering the scene graph. Rendering usually entails traversing a scene graph to determine information corresponding to the shapes defined in the graph and the associated properties, and generating display signals in accordance with the information. Publicly available rendering libraries such as OpenGL may be used to generate such a display.

While rendering a scene graph, a graphics system may maintain a 'state' while traversing the scene graph. Such a state may include information on properties which may be modified by nodes which are traversed as the scene graph is being traversed. When a shape is encountered in a traversal sequence in a scene graph, the information in the state at that traversal point may determine the properties of the shape. While rendering (either during traversal or while generating display signals) a scene graph, a state change may be undesirable because of, for example, the excessive amount of processing power or memory storage such a state change may require in a computer system.

Scene graphs may be generated by one of several programs available in the market. Such programs may not be designed to generate scene graphs for optimal rendering performance. For example, a scene graph may cause several state changes while rendering. A computer system may not have sufficient processing power and/or memory to render such scene graphs, and may accordingly be unable to generate image displays at a rate high enough for some applications, such as interactive applications.

What is therefore needed is an optimization program that optimizes scene graphs for an optimal rendering performance.

SUMMARY OF THE INVENTION

The present invention is directed to a system and method of displaying an image of an object. The method comprises the steps of accessing an original scene graph corresponding to the image and converting the original scene graph to a new scene graph. The new scene graph is optimized for a subsequent step of rendering. To render the new scene graph, the present method includes the steps of traversing the new scene graph and processing information in the plurality of nodes to generate an input data. The input data is provided to a rendering library, which processes the input data to generate the image of the object.

To convert the original scene graph to the new scene graph, the method and system of the present invention collects the shapes and the associated properties from the original scene graph, and rearranges the plurality of nodes in the original scene graph to minimize a number of state changes while rendering the scene graph.

To rearrange the nodes, the method and system of the present invention compares the values of a property of two shapes. If the two values are equal, the method and system of the present invention places a node corresponding to the property at a first level in the new scene graph, and places another node corresponding to each of the two shapes at a second level in the new scene graph. The second level is at a lower level compared to the first level in the new scene graph. The plurality of nodes of the two shapes are placed such that the property is applicable to a state of the nodes of the two shapes while traversing the new scene graph. The first node is placed at a higher level in the graph if the corresponding property is less desirable. A property may be undesirable, for example, as a change in the property may require undue processing power or memory in a computer system.

The method and system of the present invention breaks the shapes in the original scene graph into triangles and generates a plurality of strip sets from the triangles. The triangle strip sets together constitute the renderable shapes of the new scene graph.

The method and system of the present invention further examines the original scene graph to determine whether a transformation is to be performed on an object, and whether the transformation can be performed on the object in the step of converting. The method and system of the present invention determines whether a transformation can be pre-applied by determining whether the object is in a vertex-based object class. The transformed object is sent directly to the rendering library instead of sending the object and the transformation to the rendering library.

By rearranging the nodes of a scene graph according to the property nodes, the present invention minimizes a number of state changes while rendering the scene graph. By placing nodes with more undesirable properties at a relatively higher level in the new scene graph, the present invention further minimizes the impact of such undesirable property nodes on the rendering performance.

By further breaking each shape into a plurality of strip sets, the present invention further enhances the rendering performance of the new scene graph. Instead of sending coordinate data of an object and then a transformation to the underlying rendering library, the present invention may apply the transformation to the coordinates of the object, and send the coordinates of the transformed object to the rendering library. By sending the coordinates of such a transformed object, the present invention minimizes the amount of data sent to the rendering library. The processing performed by the underlying library may also be reduced.

BRIEF DESCRIPTION OF THE FIGURES

The present invention is pointed out with particularity in the appended claims. The above and further advantages of the present invention may be better understood by referring to the following description taken in conjunction with the accompanying drawings, in which:

DETAILED DESCRIPTION OF THE PREFERRED EMBODIMENTS

Figure 1:
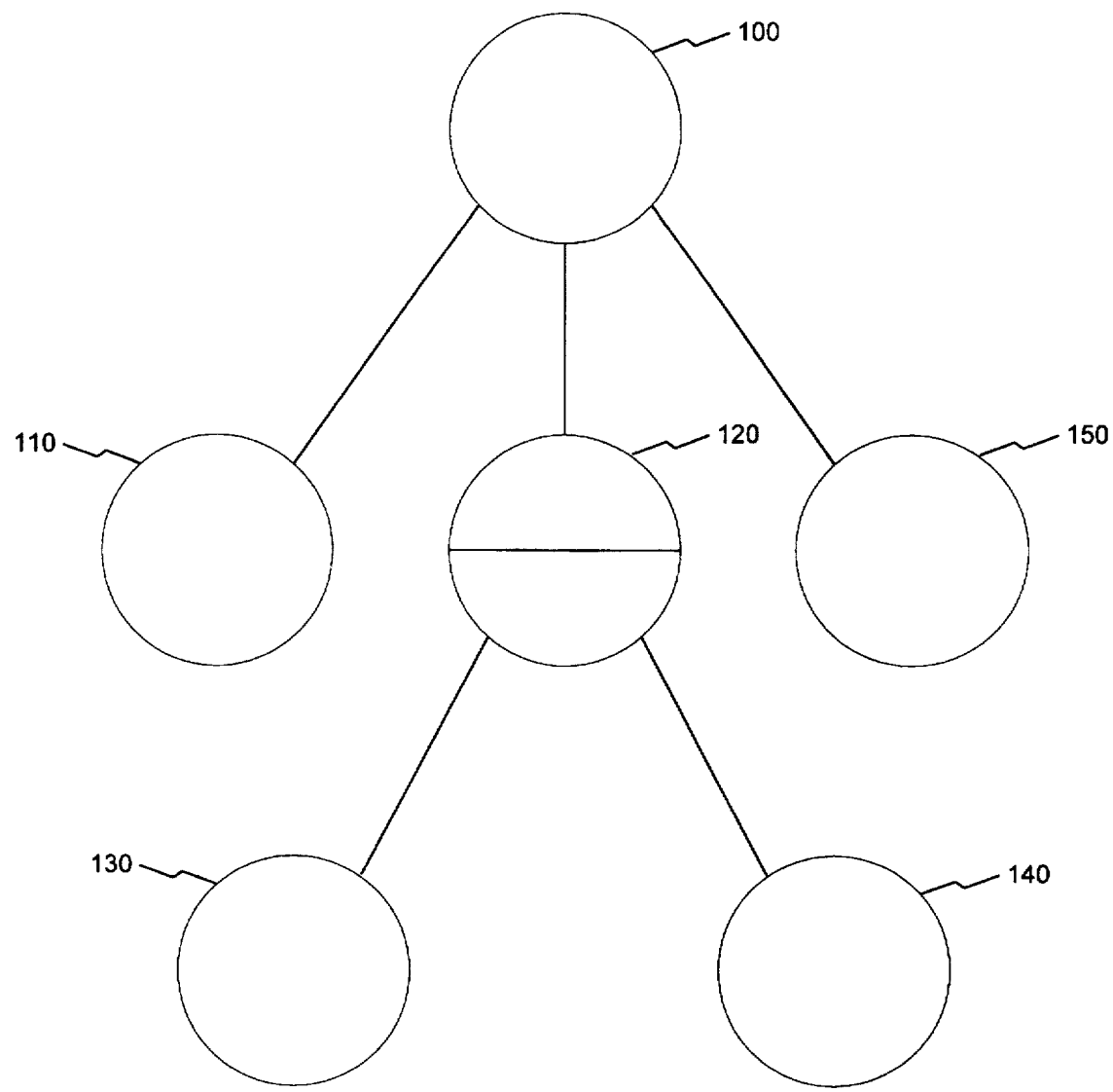
FIG. 1 is a diagram illustrating a scene graph.

FIG. 1 is a diagram illustrating a scene graph. Nodes 100 and 120 represent grouping nodes which usually have further branches. For example, node 100 has three branches beginning with nodes 110, 120, and 160 respectively. A first node in a branch may itself be a grouping node, in which case the corresponding node (e.g., node 120) defines a further sub-tree. Each grouping node typically corresponds to a part of the overall object being displayed. Node 120 may accordingly correspond to a part of the overall object being displayed. Nodes 130, 140, and 110 may be property nodes, with node 130 specifying, for example, that the corresponding color is blue, and node 140 may specify a transformation function. Such transformation functions may perform one of several functions such as moving an object and/or changing the display of an object to correspond to a new point of view. Node 150 may be a property node specifying a shape, for example, a cube. Such a cube is accordingly displayed with properties defined by nodes 110, 130, and 140.

The lines, in combination with a mode of traversal, define a sequence of the nodes. The mode of traversal may be a 'depth-first' mode which is well-known in the art. In a depth-first mode, all the sub-trees are traversed before traversing a subsequent node at a same level. For example, nodes 110, 120, and 160 are at the same level (one level from the root 100). After traversing node 120, a 'depth-first' traversal mode traverses nodes 130, 140 and 150, instead of node 160. Hence, in a depth-first scheme, the sequence of traversal in FIG. 1 is 100, 110, 120, 130, 140, 150, and 160. Displaying an image from a scene graph may entail traversing the scene graph, and processing the information provided by the graph as further explained with reference to FIG. 2. Even though the present invention is explained with reference to a depth-first sequence of traversal, it will be appreciated that the present invention may be practiced with other types of traversal schemes also.

Figure 2:
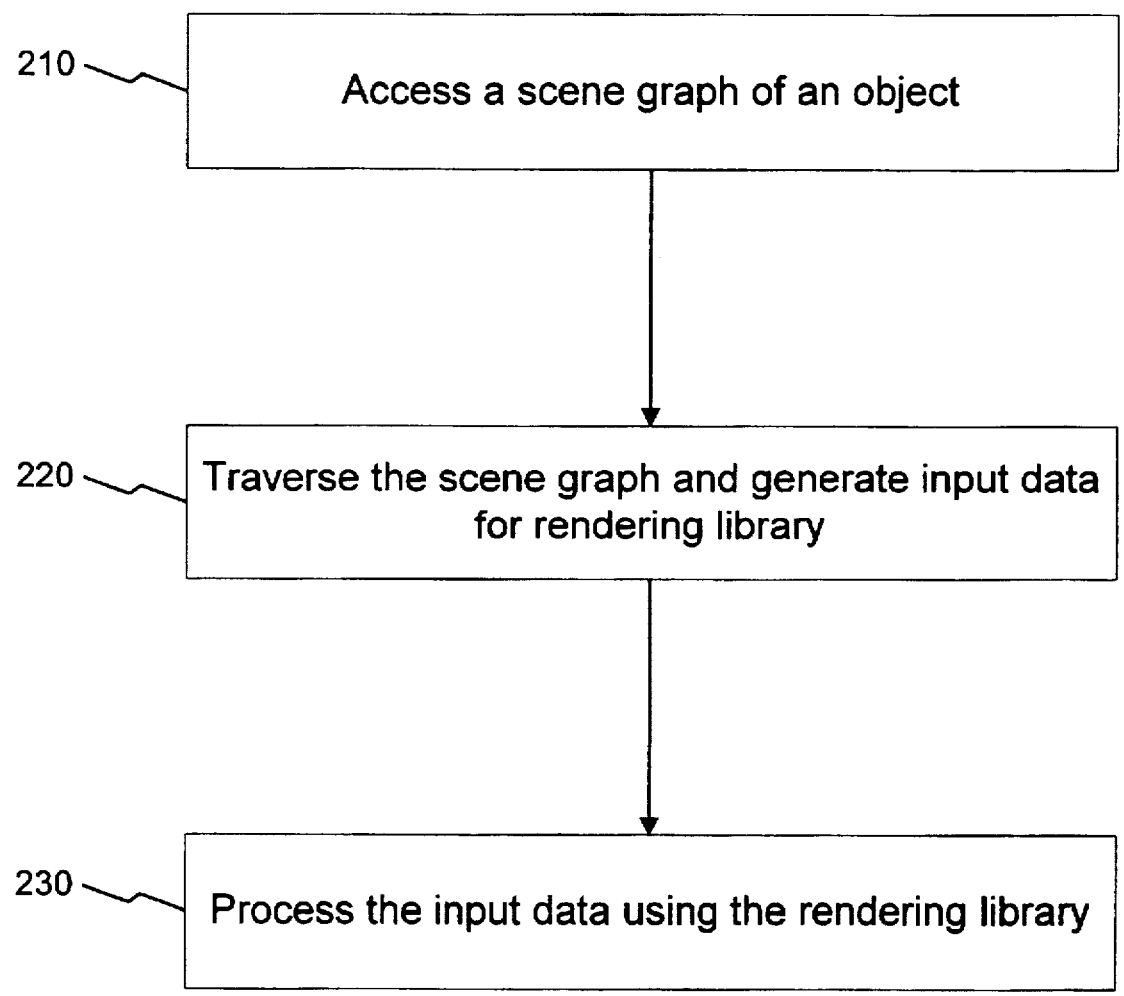
FIG. 2 is a flowchart illustrating a method of displaying an object using a scene graph.

FIG. 2 is a flow-chart illustrating a general method of displaying a multi-dimensional object in a scheme using scene graphs. In step 210, a scene graph representing an object is accessed. The scene graph may be generated in another computer system and provided to step 210. The data corresponding to a scene graph may be stored in a file on a data storage device (e.g., hard-drive on a general purpose computer system), and the scene graph may be constructed by reading and manipulating the stored data.

A scene graph may be 'rendered' by performing steps 220 and 230. In step 220, the scene graph may be traversed generating data in accordance with the contents of each node in the traversal path. The contents may be determined by the type of node. In step 230, the generated data is processed by using a rendering library to display an image corresponding to the scene graph. Step 230 is typically implemented using libraries well known in the art, such as OpenGL.

While traversing a scene graph and generating the input data for a rendering library, graphics systems usually maintain a state corresponding to each node in the scene graph. A state includes several pre-defined variables, with each variable defining a characteristic such as color, texture, material etc. For example, node 130 defines that the color is blue. Accordingly, the color variable may be changed in traversing node 130.

Changes made while traversing a node may also be applicable to subsequent nodes in the order of traversal. For example, a property defined by node 110 may be applicable to nodes 130, 140, and 150. Scene graphs also include a type of grouping node termed 'separator node'. A separator node may have the effect of shielding subsequently traversed sibling (i.e., at the same level) nodes from the changes made in children nodes (i.e., nodes in the branches emanating from a grouping node). For example, if node 120 is a separator node, the changes caused by nodes 130, 150 and 140 do not impact rendering of node 160.

Graphics systems may accordingly maintain a state table (for example, by using a stack structure well known in the art) corresponding to nodes to operate in accordance with the scheme described above. While rendering a node and sending the resulting data to step 230, a system may send state table information if there is change in the state in relation to a previously rendered node.

A change in state may have an adverse impact on the performance throughput of a graphics system. For example, such a change may require transferring the new state information to step 230, and then reconfiguring (for example, resetting a processing pipeline) the apparatus performing step 230. Either of such steps may impede the throughput performance of a graphics system, and such state changes may therefore be undesirable. In addition, the system may need additional memory space for storing such state information, leading to further degradation in performance.

The present invention is directed to a method and system for optimizing a scene graph prior to rendering the graph as illustrated with reference to the flow chart of FIG. 3. In step 310, an original scene graph of an object is accessed. In step 315, a new scene graph is generated from the original scene graph of step 310 in accordance with the present invention. The new scene graph is optimized for a subsequent rendering operation. In step 320, the nodes of the new scene graph are traversed and the contents of the nodes are processed to generate an input data for a rendering library. In step 330, the input data is provided to a rendering library which processes the input data to generate an image corresponding to the object. Steps 320 and 330 may be performed similar to steps 220 and 230 of FIG. 2. Further details on each of the steps of FIG. 3 are explained below.

As the new scene graph is optimized for processing by the rendering library, the rendering performance may be enhanced in comparison with the system described with reference to FIGS. 1 and 2.

Figure 3:
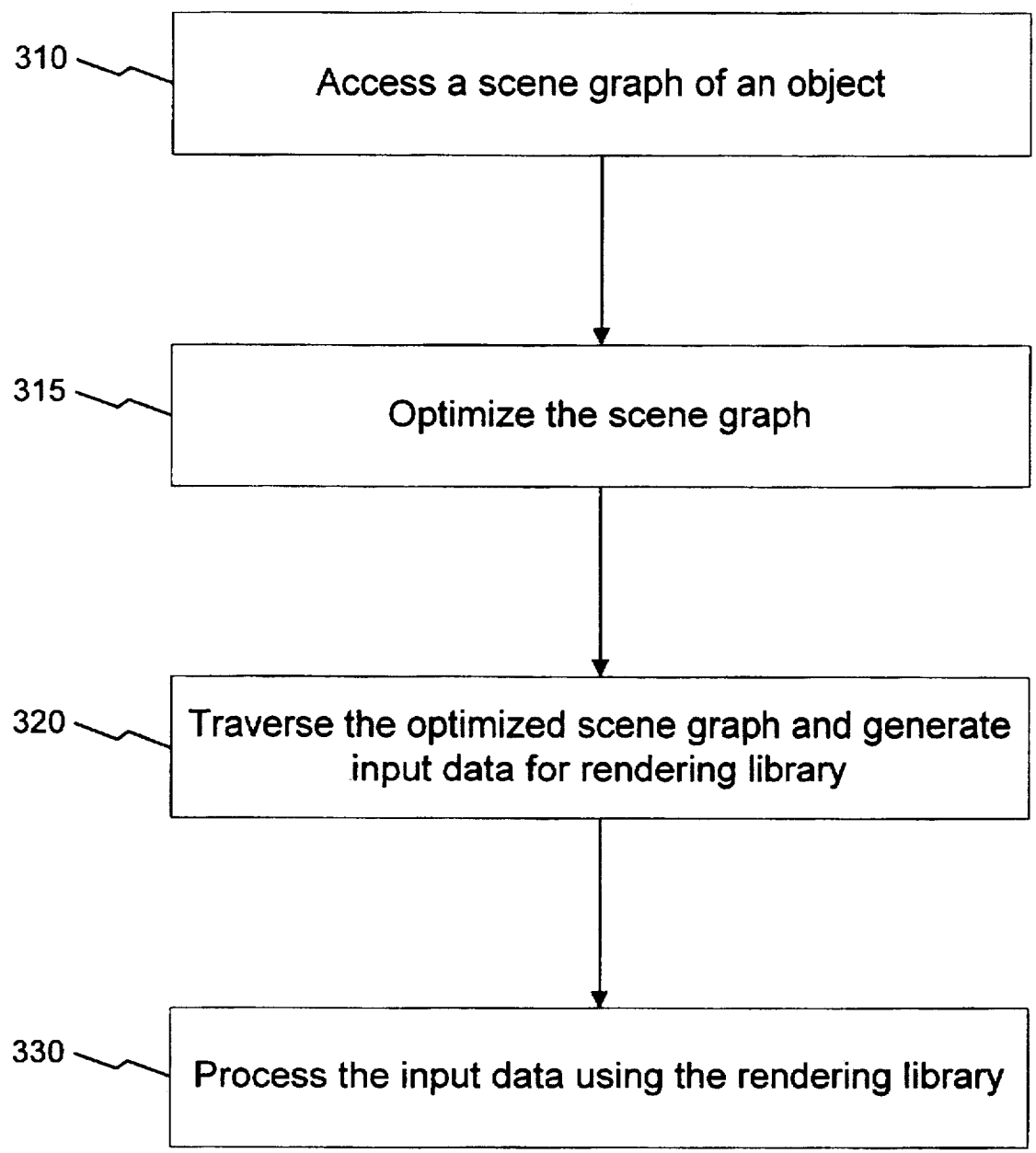
FIG. 3 is a flowchart illustrating a method employed in displaying an object in accordance with the present invention.
Figure 4:
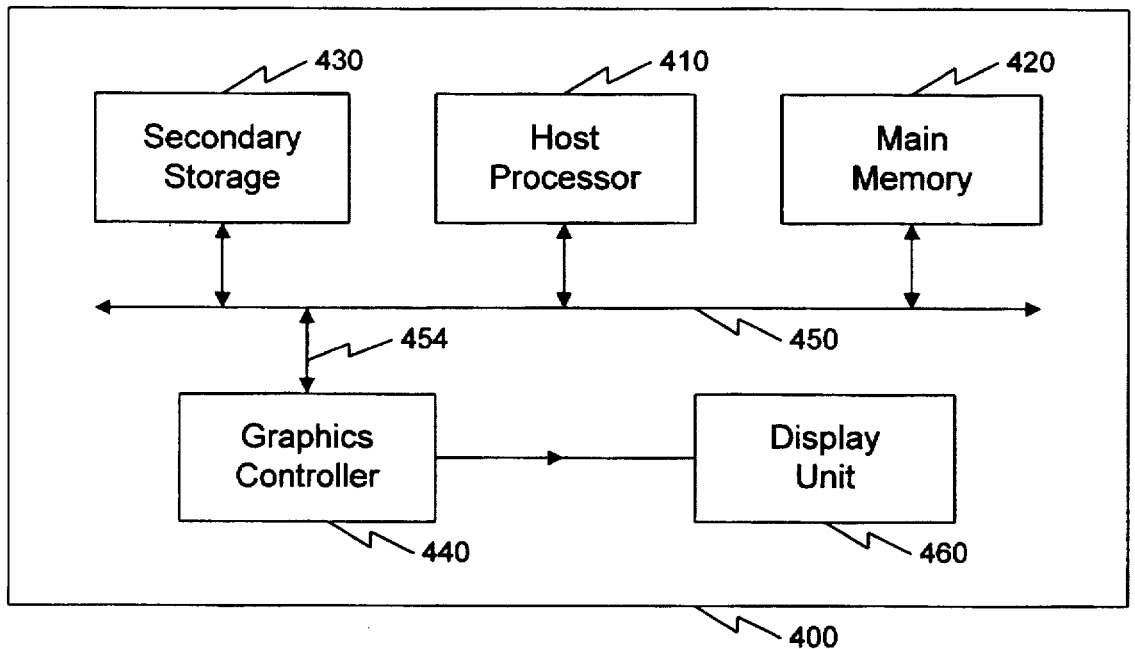
FIG. 4 is a block diagram of a computer system which displays an image of a scene graph in accordance with the present invention.

The method of FIG. 3 may be implemented in computer system 400 shown in FIG. 4. After reading the description provided herein, it will, however, be apparent to one skilled in the art to implement the present invention in other computer systems and/or architectures. Host processor 410 may comprise more than one cooperating central processing units (CPU). Host processor 410 generates a scene graph corresponding to an object by using one of well known programs such as VRML (Step 310 of FIG. 2). Scene graphs may also be generated by some other means and transferred to computer system 400. Host processor 410 may store such scene graphs on secondary storage 430.

Secondary storage 430 can include, for example, a hard disk drive and/or a removable storage drive (such as a conventional floppy disk drive), a magnetic tape drive, an optical disk drive, etc. As will be appreciated, the removable storage drive may be used to transfer original scene graphs generated elsewhere and transferred to computer system 400. Computer system 400 also includes main memory 420, preferably a random access memory (RAM). Host processor 410 retrieves a scene graph (or data corresponding to a scene graph) from secondary storage 430 into main memory 420, and optimizes an original scene graph according to the present invention (step 315 of FIG. 2).

Host processor 410 may traverse such an optimized scene graph to generate input data for processing by a rendering library (step 320). Parts of the rendering library may be implemented as software which controls operation of host processor 410, and other parts may be implemented as firmware/software which controls the operation of graphics controller 440. In an alternate embodiment, step 320 may be implemented entirely in graphics controller 440. Step 330 may accordingly be executed by one or both of graphics controller 440 and host processor 410. Host processor 410 sends commands/data (possibly including the input data for processing by a rendering library) to graphics controller 440 using system bus 450 and peripheral bus 454. Graphics controller 440 processes the received commands/data to generate display signals corresponding to an image of the object represented by a scene graph. Graphics controller 440 sends such display signals to display unit 460 which displays the image.

Figure 5:
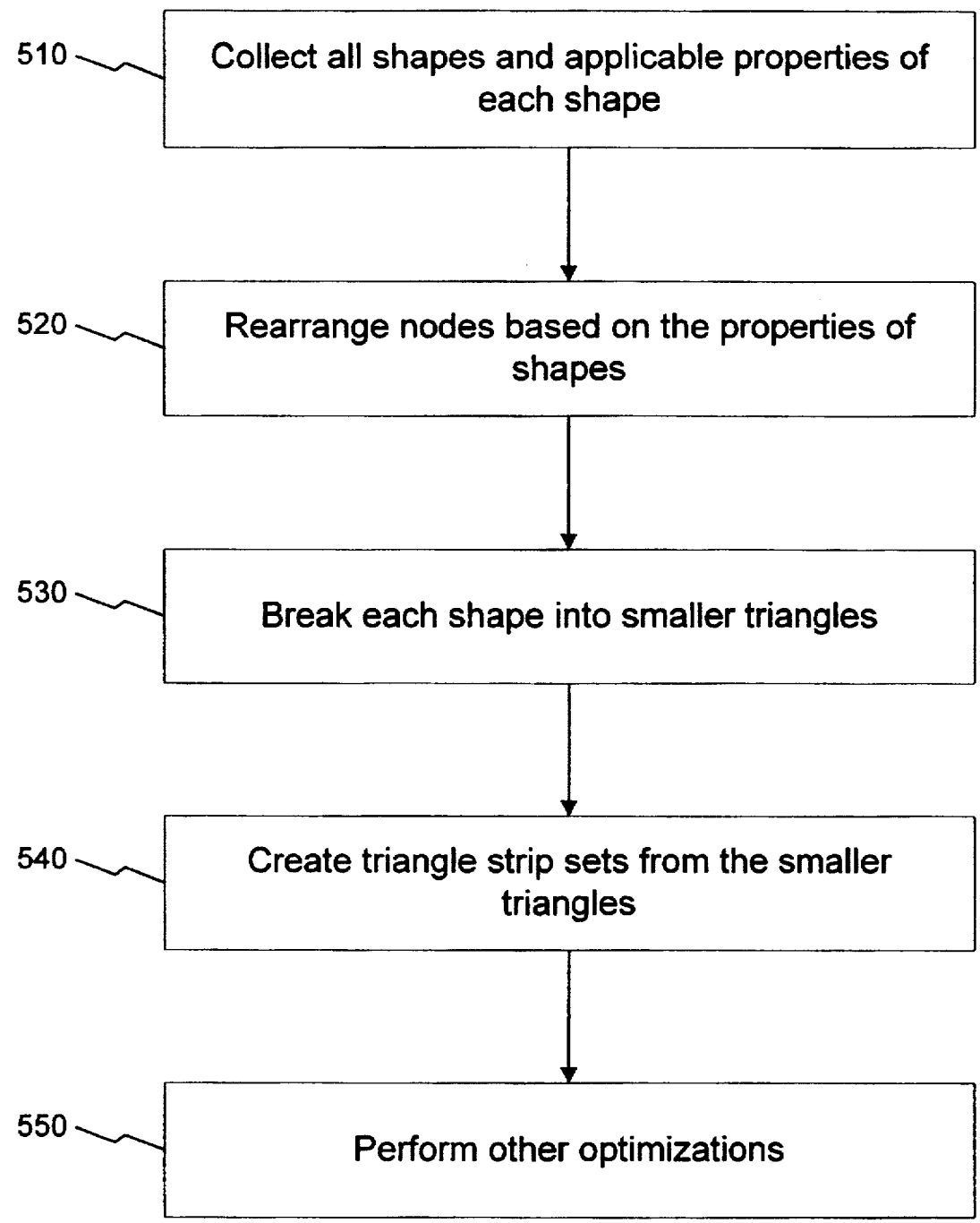
FIG. 5 is a flowchart illustrating the steps performed in optimizing a scene graph in accordance with the present invention.

To optimize a scene graph, host processor 410 processes the scene graph in accordance with the flowchart of FIG. 5. The flowchart of FIG. 5 corresponds to details of step 315 of FIG. 3. Even though the present invention is described with reference to optimizing a scene graph, it should be understood that such a scene graph may itself be a sub-part of another scene graph. Hence, the term scene graph as used in the present application may correspond to a sub-part of a scene graph also.

Continuing with reference to FIG. 5, each of the steps is first broadly described. The detailed description of each step follows then. In step 510, host processor 410 collects all shapes and applicable properties of each shape stored in a scene graph. Such a scene graph is also referred to as "an original scene graph" to distinguish from "an optimized scene graph" or "a new scene graph" generated by the optimization process of the present invention. In step 520, the nodes of the original scene graph are reordered according to the properties of the corresponding shape. As will be evident from the following description, such a reordering results in a lesser number of "state changes" when compared to the system described with reference to FIGS. 1 and 2. As explained with reference to FIGS. 1 and 2, a state change occurs when a property is changed, and such state changes may impede the rendering performance of graphics systems.

To further enhance the rendering performance, host processor 410 breaks each shape into smaller triangles in step 530, and creates triangle strip sets in step 540. As will be further explained, graphics controller 440 may be designed to render more efficiently such triangle strips, and the throughput performance of computer system 400 is accordingly enhanced in comparison with the systems described with reference to FIGS. 1 and 2. It will however be appreciated that a different optimal primitive (i.e., other than triangle strips) may be chosen without departing from the scope and spirit of the present invention. Host processor 410 optimizes the scene graph further in step 550.

Each of the steps of FIG. 5 is described in further detail below.

Figure 6A:
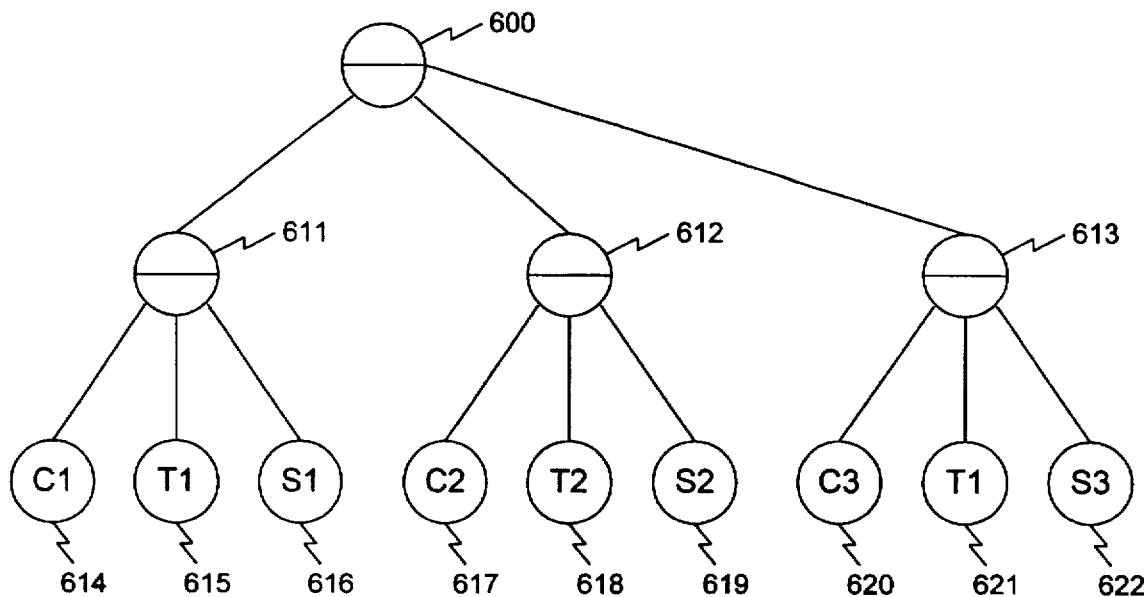
FIG. 6A is a graph representing an original scene graph which may not be optimal for a superior rendering performance.
Figure 6B:
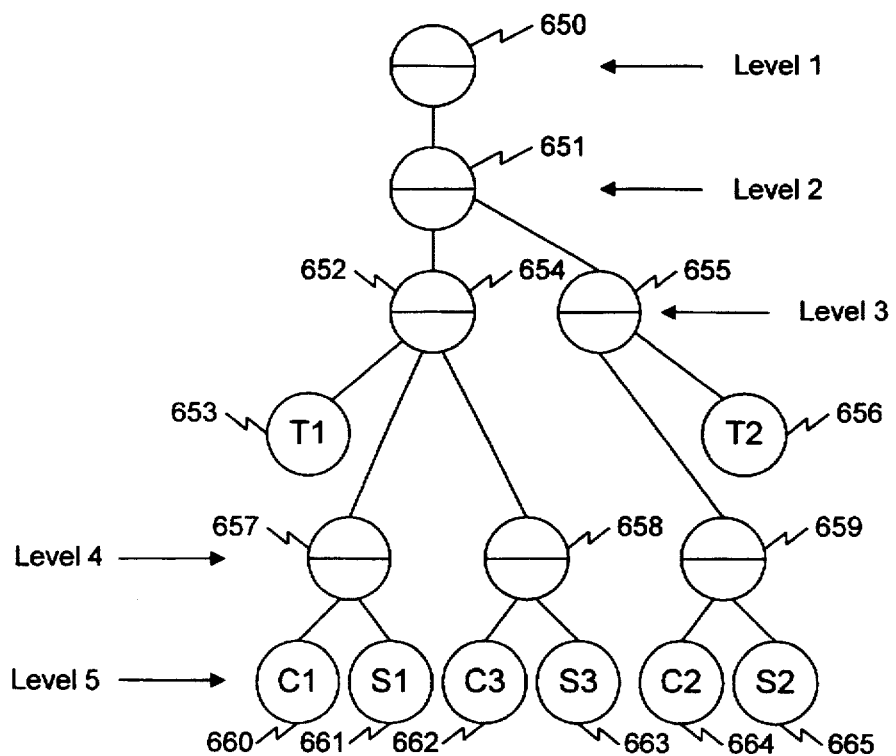
FIG. 6B is a graph representing an optimized scene graph generated by converting the original scene graph in accordance with the present invention.

The scene graphs of FIGS. 6A and 6B together illustrate the function of steps 510 and 520. FIG. 6A includes an original scene graph generated by programs such as VRML and FIG. 6B shows an optimized scene graph generated as a result of executing steps 510 and 520. For purpose of illustration, the original scene graph is shown with three separator nodes 600, 611, and 612, with each node possibly representing a portion of an object. The properties of each of such portions are specified by children nodes of a corresponding separator node. For example, the properties of a portion corresponding to separator node 600 are represented in nodes 613, 614, and 615.

For clarity purpose, the example of FIG. 6A is shown with three properties. A preferred embodiment of the present invention may have several other properties, and for further information on all properties in a preferred embodiment, the reader is referred to the section entitled, "ifshape.h" in the program listing included as Appendix I, and incorporated herein by reference.

In step 510, host processor 410 of the present invention traverses the original scene graph to gather information on different shapes, and the properties associated with each shape. A state table may be maintained while traversing the original scene graph. The state table may include several variables, with each variable storing a value corresponding to a property. If a node changes a property, the value of the changed property may be stored in the state table. When a node with a shape is visited (i.e., traversed), the state table at the time of traversal is stored, and such a stored table is associated with the corresponding shape. Main memory 420 or secondary storage 430 may store information of each shape and the associated state table (i.e., the associated properties).

Therefore, with reference to FIG. 6A, shape 1 (represented as S1 and shown at node 616) is associated with the properties C1 (color 1) and T1 (texture 1). Shape 2 has associated properties C2 (color 2) and T2 (texture 2). Shape 3 has associated properties color 3 and texture 1. It will be appreciated that the other properties may be provided by higher levels of node 600, and all such other properties may be common to shapes S1, S2, and S3. The common properties may not have much bearing on the aspect of invention described in reference to steps 510 and 520, and are therefore not discussed.

In step 520, host processor 410 rearranges the nodes of the original scene graph according to the associated properties to generate an optimized scene graph. For an understanding of such rearrangement, an understanding of the grouping of properties into different types is necessary. A manner in which a type of property may be determined in the context of the present invention is described below. However, it will be appreciated that the present invention may be practiced without resorting to such classification of properties into types, or by choosing different criteria for classification without departing from the scope and spirit of the present invention.

The properties are grouped into different types depending on the performance impact (or any desirable or undesirable impact for that matter) the specific property may have on rendering performance. For example, 'camera' property may be deemed to have the most adverse impact of all properties on rendering performance, and hence 'camera' property may be placed in type 1. A preferred embodiment of the present invention groups all the properties into five types. Properties such as font and normals which may have relatively less adverse impact on rendering performance are placed in type 5. A change of texture may have medium range adverse impact on rendering performance, and texture is accordingly placed in group 3. For an exhaustive list of properties and the type into which each property is placed, reference is made to the section entitled, "ifshape.h" in the program listing included as Appendix I.

To rearrange the nodes of the original graph according to the present invention, host processor 410 generates an optimized scene graph which has a number of levels equal to the number of types. The construction of each level of the optimized graph from the information gathered in step 510 is explained below.

The apparatus of the present invention compares the corresponding property values of all shapes to determine whether any of the shapes has a different value. Values of properties which fall into lower type numbers are compared first. Thus, in a preferred embodiment, properties in type 1 are compared first, and properties in type 5 are compared last.

The result of comparison determines a number of branches from the node at that level. If any shape has a value different from other shapes for a property, a branch is created for the branch with the different value. Thus, in the example of FIGS. 6A and 6B, there are no changes in values of properties at levels 1 and 2. On the other hand, since shapes 1 and 3 share the same texture value (T1), which is different from the texture value of shape S2, two grouping nodes are branched out at level 3. In other words, there are two different values for a property at level 3 and two grouping nodes are accordingly constructed at level 3, with each grouping node representing shapes with one of the values.

By a comparison of scene graphs in FIGS. 6A and 6B, it will be appreciated that property values are not changed for any of shapes S1, S2, and S2. However, rendering of the optimized graph of FIG. 6B will require one fewer state change than the number of state changes to render the original scene graph of FIG. 6A. Such a decrease in number of state changes results from the rearrangement of the nodes. Specifically, state change corresponding to texture is sent only once for S1 and S3 together to render the optimized graph. In comparison, state change for texture is sent two times (once each corresponding to S1 and S3, respectively) to render the original graph.

It will be further appreciated that additional rendering performance optimization may be realized due to the manner in which the types determine the branches emanating from each level. To clarify, as properties which may have worse impact on rendering performance are placed at higher levels in the graph, the number of state changes due to changes in values of such properties at higher levels is minimized. The degradation of rendering performance is accordingly reduced in rendering optimized graphs in comparison to rendering the corresponding original graphs.

Referring now solely to FIG. 5, steps 530 and 540 operate to break each shape into several triangles, and to generate an optimized primitive such as a triangle strip set from the triangles. From the following explanation, it will be appreciated why rendering triangle strip sets usually results in enhanced rendering performance, and the manner in which the present invention generated triangle strip sets from each of the shapes. One of several well-known techniques may be employed to break up a shape into triangles. It will be further appreciated that steps 530 and 540 may be performed either on shapes in optimized graphs such as that shown in FIG. 6B to further optimize the scene graph or on shapes in the original graph of FIG. 6A.

Figure 7:
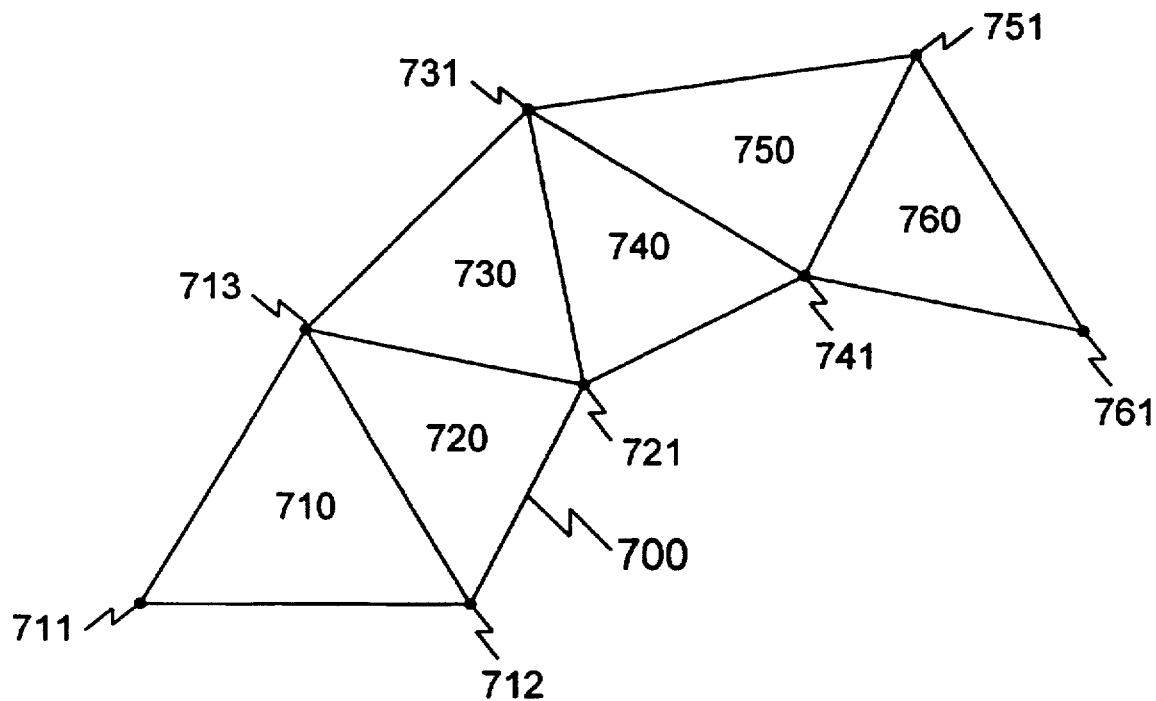
FIG. 7 is a diagram of a triangle strip set illustrating how a triangle strip set leads to a superior rendering performance.

FIG. 7 is a diagram of a triangle strip set 700 including several triangles 710, 720, 730, etc. In a scheme using triangle strip sets, the rendering library may be notified that what is to follow is a triangle strip set. The first two coordinates define the first edge of a triangle, e.g., the edge defined by vertices 711 and 712 of triangle 710. After sending the first edge, the rendering library needs to receive data for only one vertex, and the rendering library can generate an additional triangle using the one vertex. For example, after receiving the first edge, the rendering library generates triangle 710 after receiving vertex 713. Similarly, after receiving data of vertex 721, rendering library generates triangle 720. As will be appreciated, the order in which the data of vertices of a triangle is sent may be important, as the rendering library may use two of the vertices for generating a subsequent triangle.

As data for only one vertex is sent to generate an additional triangle, triangle strip sets based rendering may be a preferred method of rendering a shape if the shape can be modeled as triangle strip sets. Therefore, the present invention breaks each of the primitive shapes into a smaller number of triangles in step 540, and then creates triangle strip sets in step 550.

Figure 8A:
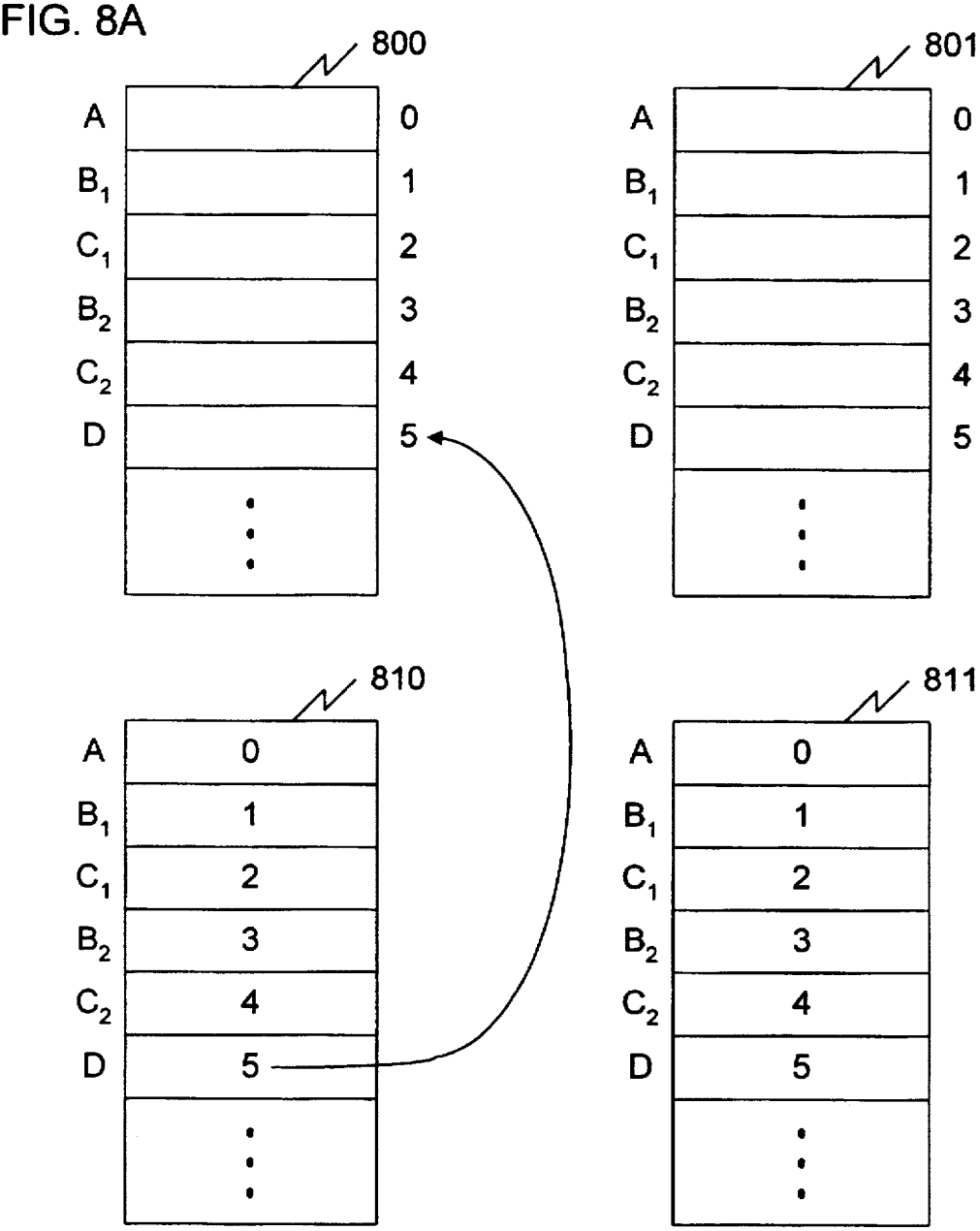
FIG. 8A is a diagram including tables which are used to illustrate the manner in which a preferred embodiment determines whether two vertices of different triangle correspond to a single vertex.

In step 540, host processor 410 breaks each of the shapes (including sphere, cone etc. which may be represented by functions) into several triangles. Each of the triangles is defined by three vertices. Each vertex in turn is defined by data items including coordinates data, normal data, texture coordinate data, etc. A preferred embodiment of the present invention maintains a table for each of the data items, and a parallel index table for each of the tables, as shown in FIG. 8A. The index tables will be used to indicate and determine which of the vertices are identical, and will be explained in further detail with reference to step 550. For the purpose of conciseness and clarity, only tables corresponding to coordinate data (table 800) and normal data (table 802) are shown in FIG. 8A. However, it should be understood that a preferred embodiment maintains corresponding tables for each of the data items defining a vertex.

Figure 8B:
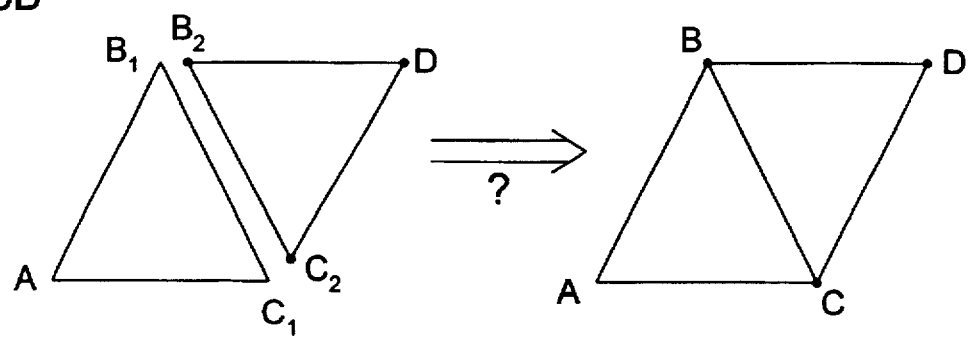
FIG. 8B is a diagram of two adjacent triangles which are included in a triangle strip set.

Coordinate data table 800 stores the coordinate data (e.g., X, Y, and Z coordinates or other forms) for each of the vertices. For illustration purpose, two triangles $AB_1C_1$ and $B_2C_2D$ are shown in FIG. 8B, and the corresponding data items are shown stored in tables of FIG. 8A. Index table 810 stores an index for each of the vertices into coordinate data table 800. For example, an entry index table 810 is shown with a value 5, which implies that the coordinate data for vertex corresponding to that entry (i.e., D) is the 5th entry in the coordinate data table. The organization of data in normal data table 801 and the corresponding index table 811 is similarly explained.

In step 550, host processor 410 of the present invention generates triangle strip sets from the triangle data generated in step 540. Broadly, the data items of each vertex are examined first to determine if any two of the vertices of different triangles represented in tables 800 and 801 in fact represent a single vertex. For example, host processor 410 determines whether vertices $B_1$ and $B_2$ are in fact a single vertex B, so that vertices $B_1$ and $B_2$ can be merged into B to create triangle strip sets. Hence, after determining whether two vertices of two different triangles are in fact a single vertex, the present invention generates triangle strip sets The following description provides further details on how the preferred embodiment of the present invention determines whether two vertices of two different triangles in fact represent a single vertex, and how the preferred embodiment generates triangle strip sets. However, the reader is referred to the section entitled, "ifstripper.c" in the program listing of Appendix I for further details on the implementation of these two steps.

Two vertices are determined to be identical if all the data items of the two vertices are equal, i.e., if all corresponding indices are equal. Host processor 410 therefore compares each entry of a data item with all other items within the same table, and if two entries are equal (or within a predetermined range of difference), the corresponding entries in index table 810 are adjusted to reflect the equality. For example, if the coordinate data of vertex $B_1$ is found to be equal to $B_2$, the entry in index table 810 for $B_2$ is changed to be equal to the index entry for $B_1$. Thus, if coordinates for $B_1$ are equal to coordinates for $B_2$, the index entry for $B_2$ is changed from 3 to 1 in index table 810.

Vertices $B_1$ and $B_2$ are determined to be a single vertex B if the values for $B_1$ and $B_2$ are found to be equal in all the other data item tables, such as 801, also. Two identical vertices may be condensed into one vertex. To determine whether to condense two vertices, the corresponding all corresponding values in index tables such 810 and 811 are compared, and if all the values are found to be equal, the two vertices may be condensed into one vertex. In operation, if $B_1$ and $B_2$ are to be condensed, a value of 1 will have replaced value 3 in both index tables 810 and 811.

To compare entries within coordinate table 800, a preferred embodiment may hash each of the entry values in tables 801 and 800 into a unique number using one of several well-known hashing functions. The hashed values may then be compared to determine whether any two vertices of different triangles are equal. The index tables 801, 811 are modified to reflect equal results.

The method in which a preferred embodiment of the present invention creates triangle strip sets is now described. From the index tables 810 and 811, the apparatus of the present invention creates a list of unique vertices and the associated data item values. Any vertex having all index values equal to another vertex is termed a duplicate vertex, and only one of the duplicate vertices is included in the unique vertices list.

A preferred embodiment may then generate a list of triangles with associated edges. An edge is identified by two vertices in the unique vertices list. For each edge of a triangle, a list of the neighbor triangles and a count of the number of unprocessed neighbor triangles is maintained.

Two triangles are termed neighbors if they both share a common edge. A triangle is termed unprocessed if the triangle is not yet included in any triangle strip set. The count represents a number of neighbor triangles which have not yet been included in any triangle strip set. Initially such a count is set to the number of neighbors. A list of pending triangles is also maintained, which indicates all triangles that have not yet been included in any triangle strip set. Initially the list of pending triangles includes all the triangles.

To begin generating a triangle strip set, a suitable first triangle is first determined. A triangle is better suited as a first triangle in a triangle strip set if that triangle has a lesser number of unprocessed neighbors. In essence, the idea is to start from an edge of a shape to maximize the number of triangles in a triangle strip set. Maximizing such number results in a correspondingly lesser number of triangle strip sets, which again results in better rendering performance. If a triangle has zero neighbors, the triangle exists in isolation, and may constitute a strip set by itself. As a triangle strip set ends, if there are more members in the pending triangle list, the apparatus of the present invention begins creating a new triangle strip set list. A suitable first triangle for the new triangle strip set is again selected.

If a first triangle of a strip list has at least one neighbor, a neighbor triangle is selected using the neighboring triangle list that is maintained. The selected neighbor triangle is deleted from the neighbor triangle list of the common edge. Both the neighbor triangle and the first triangle are included in the present triangle strip list. As a triangle is included in a strip set, the triangle is marked as used (i.e., deleted) in the pending triangle list. The neighboring triangles count in all triangles adjacent to the included triangle is decremented.

After including a triangle in a strip list, one of the neighbors of the included triangle is selected as a next triangle in the strip list. The step is continued until a last included triangle has no neighbors. When a triangle with no neighbors is included in a strip list, the strip list is ended. If there are more triangles in the pending triangle list, a suitable first triangle is selected for a new strip list, and the above process repeated.

It will be appreciated that the order in which the vertices are sent is important while generating a triangle strip list. Usually, the vertex opposite to the common edge is sent first followed by the vertices of the common edge. The rendering library uses the common edge to render a subsequent adjacent triangle after receiving just the other vertex of the adjacent triangle.

The triangle strip sets thus created may be sent to an underlying library for processing as explained with reference to FIG. 7. As rendering triangle strip sets usually results in a superior rendering performance, the rendering performance of host processor 410 is typically enhanced. Even though steps 530 and 540 of FIG. 5 are explained as processing an output generated by step 520, it will be appreciated that steps 530 and 540 may be applied directly to any shape without the reorganization of step 520.

In step 550 of FIG. 5, host processor 410 may perform other optimizations of a scene graph in accordance with the present invention. Host processor 410 examines an optimized graph to determine whether such an optimized graph may be further optimized for rendering performance. For example, nodes 650 and 651 of FIG. 6B may be combined into one node as nodes 650 and 651 do not effectively change the present state. It will be appreciated that the graph of FIG. 6B is an output resulting from the application of the present invention to the graph of FIG. 6A.

Host processor 410 of the present invention may also maintain a 'local copy' of all the state variables for some nodes. Maintaining such a local copy eliminates the need for host processor 410 to have to access corresponding state table copy which may be stored else where. Host processor 410 may store the local copy in main memory 420 for faster access. The rendering performance of a scene graph may accordingly be increased.

Host processor 410 may further optimize an original scene graph by examining the property nodes for any transformation functions. In some prior systems, a graphics system may first send data for a shape first, and then a transformation matrix to accomplish the transformation function. An underlying rendering library may apply the transformation matrix to the shape to achieve the desired transformation. As will be appreciated, in such prior systems, two different data transfers to a rendering library are required, one for sending the shape data and the other for sending the transformation data.

In accordance with the present invention, host processor 410 determines whether a transformation corresponding to a transformation function may be performed on the shape prior to sending the data to a rendering library. Host processor 410 may make such a determination, for example, by examining the type of object a shape represents. If the object is represented as a vertex based object (i.e., shaped represented as vertices connected by lines), host processor 410 may decide to perform the transformation itself. In the alternate, host processor 410 may rely on a user input to make such determination. If host processor 410 determines to perform the transformation, host processor 410 applies the transformation function to the coordinates of the object, and then sends the result only to the underlying rendering library. It will be appreciated that the amount of data transferred may thus be reduced due to the optimization undertaken by host processor 410. In addition, the processing to be performed by graphics controller 440 may also be reduced.

The present invention is preferably implemented using software running (that is, executing) in an environment similar to that described above with respect to FIG. 3. Thus, the term "computer program product" is used to generally refer to a program stored in secondary storage 430. These computer program products are means for providing software to computer system 400.

Computer programs (also called computer control logic) are stored in main memory and/or secondary memory 440. Such computer programs, when executed, enable computer system 400 to perform the features of the present invention as discussed herein. In particular, the computer programs, when executed, enable host processor 410 to perform the features of the present invention. Accordingly, such computer programs represent controllers of computer system 400.

In an embodiment where the invention is implemented using software, the software may be stored in a computer program product and loaded into computer system 400 using a removable storage drive comprised in secondary storage 430. The control logic (software), when executed by the processor 404, causes the processor 410 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

It should be understood that embodiments of the present invention can be implemented in hardware, software or a combination thereof. In such embodiment, the various component and steps would be implemented in hardware and/or software to perform the functions of the present invention. Any presently available of future developed computer software language and/or hardware components can be employed in such embodiments of the present invention. In particular, the program listing included in Appendix I and the flow charts provided above can be especially useful for creating the software embodiments.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for increasing the performance for rendering a three dimensional image on a display screen by reorganizing a scene graph comprising a plurality of nodes used to represent the three dimensional image, said method comprising the steps of:

accessing the scene graph;

converting the scene graph to an optimized scene graph, wherein the optimized scene graph is organized to minimize a number of state changes;

traversing the optimized scene graph and processing information in the plurality of nodes to generate an input data; and providing the input data to a rendering library, wherein the rendering library processes the input data to generate the three dimensional image.

2. The method of claim 1 wherein the step of converting further comprises the steps of:

collecting shapes and associated properties represented by the plurality of nodes.

3. The method of claim 1, wherein the step of converting further comprises the steps of:

comparing the values of a property of two shapes;

placing a node corresponding to the property at a first level in the optimized scene graph if the two values are equal;

placing a node corresponding to each of the two shapes at a second level in the optimized scene graph if the two values are equal, wherein the second level is at a lower level compared to the first level, and wherein the plurality of nodes of the two shapes are placed such that the property is comprised in a state of the nodes of the two shapes while traversing the optimized scene graph.

4. The method of claim 3 wherein the step of placing a node corresponding to the property further comprises the steps of:

determining a type of the property, wherein the type defines a desirability level of a change in a state due to a change of the property; and placing the node corresponding to the property at a higher level in the optimized scene graph if the type of the property is undesirable.

5. The method of claim 1 wherein the step of converting further comprises the steps of:

breaking the shapes into a plurality of optimized primitives; and constructing the optimized scene graph from the plurality of optimized primitives.

6. The method of claim 5 wherein each of the optimized primitives comprises a triangle strip set.

7. The method of claim 6 wherein the step of constructing the optimized scene graph comprises the steps of:

determining whether any of two vertices of different triangles comprise a single vertex;

generating a list of unique vertices comprising the single vertices;

generating a list of triangles defined by the list of unique vertices; and generating a plurality of strip triangle lists from the list of triangles.

8. The method of claim 1 wherein the step of converting further comprises the steps of:

examining the scene graph to determine whether a transformation is to be performed on an object;

determining whether the transformation can be performed on the object in said step of converting;

pre-applying the transformation to the coordinates of the object to generate the coordinates of a transformed object; and sending the coordinates of the transformed object to the rendering library.

9. The method of claim 8 wherein the step of determining comprises examining whether the object is in a vertex-based object class.

10. A method for optimizing rendering performance of a three dimensional image on a display screen by reorganizing a scene graph comprising a plurality of nodes used to represent the three dimensional image, said method comprising the steps of:

collecting rendered shapes and the associated properties by traversing the nodes of the scene graph and maintaining a state table to track state chances;

reordering the collected shapes to minimize the state changes;

converting the reordered shapes into optimized primitives; and constructing a new scene graph from said optimized primitives.

11. A computer program product comprising a computer useable medium having computer program logic stored therein, said computer program logic for enabling a computer to increase the performance for rendering a three dimensional image on a display screen by reorganizing a scene graph comprising a plurality of nodes used to represent the three dimensional image, said computer program logic comprising:

means for enabling the computer to access the scene graph;

means for enabling the computer to convert the scene graph to an optimized scene graph, wherein the optimized scene graph is organized to minimize a number of state changes;

means for enabling the computer to traverse the optimized scene graph and process information in the plurality of nodes to generate an input data; and means for enabling the computer to provide the input data to a rendering library, wherein the rendering library processes the input data to generate the three dimensional image.

12. The computer program product of claim 11, wherein said means for enabling the computer to convert further comprises:

means for enabling the computer to collect shapes and associated properties represented by the plurality of nodes.

13. The computer program product of claim 11, wherein said means for enabling the computer to convert further comprises:

means for enabling the computer to compare the values of a property of two shapes;

means for enabling the computer to place a node corresponding to the property at a first level in the optimized scene graph if the two values are equal;

means for enabling the computer to place a node corresponding to each of the two shapes at a second level in the optimized scene graph if the two values are equal, wherein the second level is at a lower level compared to the first level, and wherein the plurality of nodes of the two shapes are placed such that the property is comprised in a state of the nodes of the two shapes while traversing the optimized scene graph.

14. The computer program product of claim 13, wherein said means for enabling the computer to place a node corresponding to the property further comprises:

means for enabling the computer to determine a type of the property, wherein the type defines a desirability level of a change in a state due to a change of the property; and means for enabling the computer to place the node corresponding to the property at a higher level in the optimized scene graph if the type of the property is undesirable.

15. The computer program product of claim 11, wherein said means for enabling the computer to convert further comprises:

means for enabling the computer to break the shapes into a plurality of optimized primitives; and means for enabling the computer to construct the optimized scene graph from the plurality of optimized primitives.

16. The computer program product of claim 15, wherein each of said optimized primitives comprises a triangle strip set.

17. The computer product of claim 16, wherein said means for enabling the computer to construct the optimized scene graph comprises:

means for enabling the computer to determine whether any of two vertices of different triangles comprise a single vertex;

means for enabling the computer to generate a list of unique vertices comprising the single vertices;

means for enabling the computer to generate a list of triangles defined by the list of unique vertices; and means for enabling the computer to generate a plurality of strip triangle lists from the list of triangles.

18. The computer program product of claim 11, wherein said means for enabling the computer to convert further comprises:

means for enabling the computer to examine the scene graph to determine whether a transformation is to be performed on an object;

means for enabling the computer to determine whether the transformation can be performed on the object by said means for enabling the computer to convert;

means for enabling the computer to pre-apply the transformation to the coordinates of the object to generate the coordinates of a transformed object; and means for enabling the computer to send the coordinates of the transformed object to the rendering library.

19. The computer program product of claim method of claim 18, wherein said means for enabling the computer to determine comprises means for enabling the computer to examine whether the object is in a vertex-based object class.

* * * * *